UNITED STATES PATENT OFFICE.

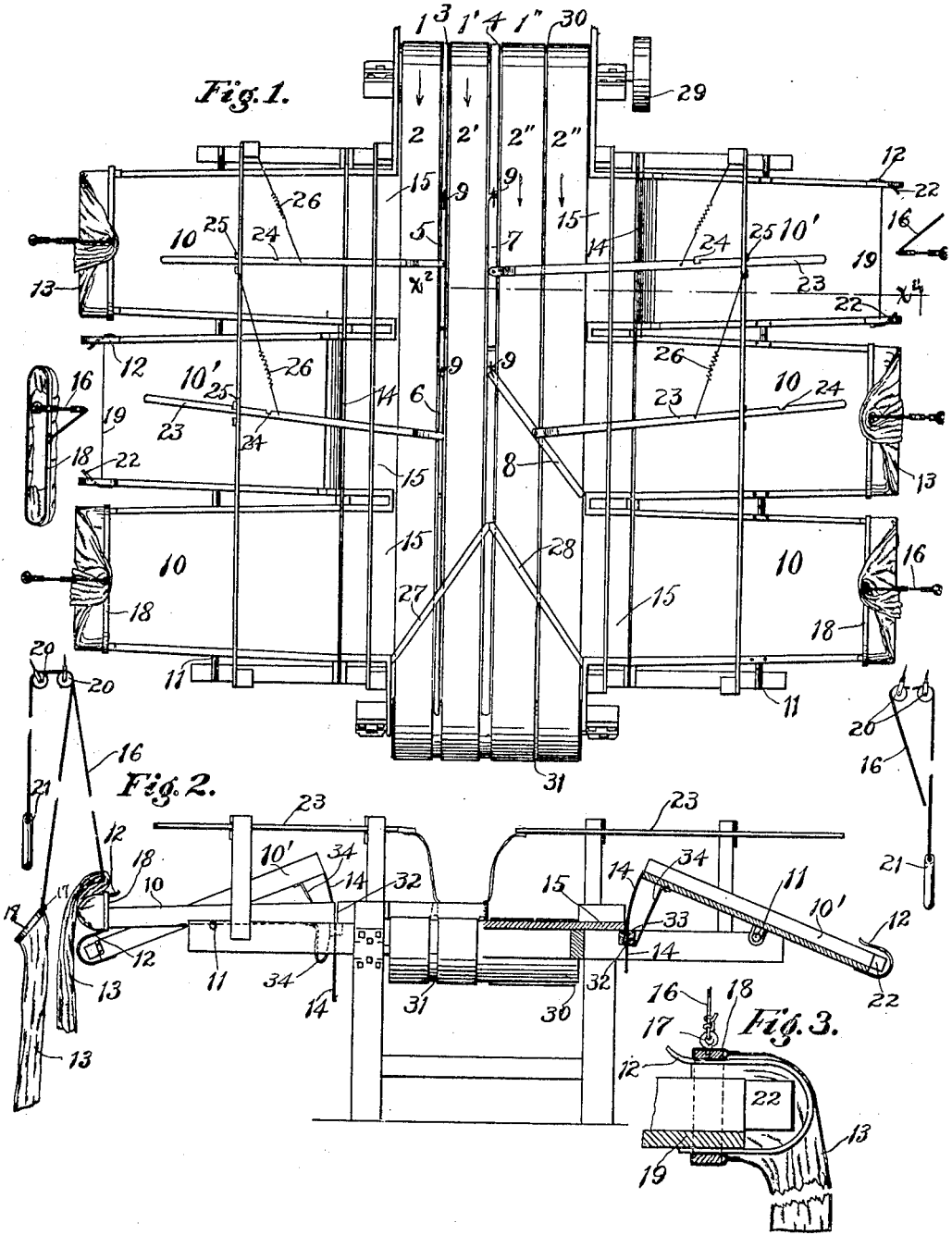

CHARLES C. TEAGUE, OF SANTA PAULA, CALIFORNIA, ASSIGNOR OF ONE-FOURTH TO JOHN B. HORRELL, ONE-FOURTH TO ARTHUR S. BRYANT, BOTH OF SANTA PAULA, CALIFORNIA, AND ONE-HALF TO LIMONERIA COMPANY, OF SANTA PAULA, CALIFORNIA, A CORPORATION OF CALIFORNIA.

FRUIT-CRATER.

No. 856,993.  Specification of Letters Patent.  Patented June 11, 1907.

Application filed January 2, 1906. Serial No. 294,161.

*To all whom it may concern:*

Be it known that I, CHARLES C. TEAGUE, a citizen of the United States, residing at Santa Paula, in the county of Ventura and State of California, have invented a new and useful Fruit-Crater, of which the following is a specification.

This invention relates to means for placing fruit in crates, boxes, or trays, without bruising or abrading the same.

The invention is designed for use at the tail of a fruit washer or brusher, but is applicable for receiving fruit from any source, and allowing the operator to place the same in boxes or trays with great ease and convenience and without damage to the fruit.

A feature of the invention is to provide means by which the operator can rapidly handle the fruit from a number of chutes, and a feature among others of this invention is the convenient means for closing the end of the tilting chute while the same is being filled, and then emptying the contents of the chute into a suitable conveyer to transport said contents to the box in which the fruit is to be placed; provision being made whereby all the operations of filling, transporting, and emptying the transporting device and again returning the same into position for closing the chute to receive another load, can be performed by the operator with the greatest ease and expedition. For this last-named purpose there is provided a tilting chute and a bottomless bag or flexible chute detachably connected with the outlet of the tilting chute, and adapted to be folded up over the end of the tilting chute to close the same while the chute is being filled, and counterbalance suspending means whereby the bag or flexible chute can be carried when the same has been filled and is detached from the tilting chute. The floor of the tilting chute normally forms a continuation of the floor of the run-way so that the fruit gently rolls into the tilting-chute without being bruised.

The accompanying drawings illustrate the invention:

Figure 1 is a plan of a fruit crater embodying the invention, showing parts in the different positions they occupy at different stages of use. Fig. 2 is an elevation partly in section on line $x^2$—$x^2$, Fig. 1, looking in the direction of the arrows that cross said line. Fig. 3 is an enlarged, fragmental, sectional detail of the end of a tilting chute and open-ended bag thereon.

In the drawings, the machine is shown with a plurality of intercommunicating run-ways 1, 1', 1'', respectively provided with traveling floors formed of belts 2, 2', 2'', and separated by partitions 3, 4, which are provided with gates 5, 6, 7, 8, swinging on hinges 9, for the purpose of directing the fruits from the run-ways alternatively into the tilting chutes 10 which are respectively mounted on pivots 11 and are each provided at the discharge end, mouth or outlet, with means 12 in the form of spring bows or hooks for holding a bottomless bag 13, and provided at the receiving end with means in the form of a stop or shield 14 which constitutes a cut off to stop the fruit in the lateral outlets 15 which lead from the run-ways into the tilting chutes 10.

16 is a suspending device in the form of a cord fastened by suitable means, as an eye 17, to an open frame 18 at the mouth of the bag which is adapted to fit over the discharge end or outlet 19 of the tilting chute, and over the bows 12 thereof which hold the mouth of the bag open to receive the fruit from the tilting chute when the same is tilted. The suspending cord 16 is led over the overhead pulleys 20, and is counterbalanced by weight 21, so that when the bag 13 is fitted over the outlet of the chute 10 the weight 21 will tend to hold the chute in approximately horizontal position for receiving the fruit, as indicated at the left of Fig. 2.

The bows 12 being of metal, normally overbalance the chute 10 so that when the force of the weight 21 is not applied through the cord 16 and bag-mouth to hold the tilting chute in receiving position, said chute will stand in tilting position shown at 10'.

22 indicates guides at the outlet ends of the tilting chutes to direct the fruit into the mouth of the bag.

23 designates means for operating the cut-off gates respectively, the same being in the form of a handle provided with notches 24 to catch on catches 25 to hold the gates in position for appropriately directing the fruit.

26 indicates springs for holding the handles 23 taut in the appropriate notch 24.

27 indicates a wall aslant across the runways 2, 2', to direct the contents of said runways into the last chute of the series on one side; and 28 is a like slanting wall to direct the fruit into the last chute of the series on the other side of the machine.

29 is a driving pulley, and 30, 31, are pulleys at the ends of the machine for carrying the belts 2, 2', 2'', which form the traveling floors of the run-ways.

By providing a number of run-ways, as shown, the fruits of different kinds may be directed into different receptacles at the will of the attendant who can select the fruit as it passes along the traveling floor of any run-way, and transfer by hand any fruit from one traveling floor where it does not belong to another traveling floor appropriated to it.

In practical use, the power is applied through the pulley 29 by a belt, not shown, and the traveling floors will be driven in the direction indicated by the arrows thereon. The open frame 18 of the bottomless bags 13 will be brought over the bows 12 and thereby held inclosing the outlets of the chutes 10. The counter-balance 21 will serve to maintain the chutes in horizontal position, and the body of the bag will preferably be thrown around the suspending cord 16, as will be clearly understood from reference to the drawings. The attendant will then appropriately adjust the gates 5, 6, 7, 8, to direct the fruits into such runway outlet 15 as may be desired. So long as the tilting chutes are in approximately horizontal position the fruits or any other material traveling in the run-ways may be directed through any one of the appropriate outlets 15 into the appropriate chute. When the chute is filled with a single layer of the fruits, or other material not shown, the operator may release the body of the bottomless bag, to allow the fruit to run into it, and may hold the lower end of the bag up so as to ease the descent of the fruit into it; he may also lower the suspending cord 16, thus tilting the chute, as indicated at 10' in Fig. 2, whereupon the fruits or other material in the chute will run down into the bag, the attendant in the meantime appropriately lowering the loose end of the bag so as to allow it to receive all the fruits contained in the chute. The attendant may then withdraw the frame 18 from the bows 12 and by reason of the counter-balance 21 the bag is easily held up and transported to a nearby crate or box, not shown, whereupon the attendant by lowering and releasing the lower end of the bottomless bag allows the fruit therein to gently run into the box, crate or tray into which it is desired to place the same.

Preferably, a number of attendants will be required to each machine, as the fruit is very rapidly handled and one attendant will be unable to care for the fruit that can be disposed of by a machine having the number of chutes shown in the drawings.

As the tray is tilted, the stop or shield 14—which may be in the form of a flap made of rubber, or some other suitable kind of belting, extending down through a space 32 between the end of the lateral outlet 15 and the support 33 for the receiving end of the tilting chute,—will close the outlet 15, thus preventing the escape of fruit, or any other material, from the run-way at the outlet for the tilted chute until the chute is again returned to its receiving position.

34 is a retainer in the form of a strap for preventing the chute from tilting too far.

What I claim is:

1. A runway provided with a lateral opening, a tilting chute communicating with such opening, means to stop the opening when the chute is tilted, and a bottomless bag detachably connected with the outlet of the chute.

2. A runway provided with a lateral opening, means for diverting contents of the runway into such opening, a tilting chute communicating with the opening, means to stop the opening when the chute is tilted, and a bottomless bag detachably connected with the outlet of the chute.

3. A runway having an outlet, a tilting chute communicating with such outlet, means for closing said outlet when the chute is tilted, and a bottomless bag detachably connected with the outlet of the chute.

4. A tilting chute, a bottomless bag detachably connected with the outlet thereof, the same forming a flexible chute and adapted to close said outlet when folded, and counter balancing suspending means connected with the bag.

5. A chute, a bottomless bag detachably connected with the outlet of the chute and adapted to fold over said outlet to close the same and counterbalancing suspending means connected with the bag.

6. A tilting chute, a runway for supplying material to the chute, and a cut-off fastened to and depending from the supply end of the chute to cut off the supply means when the chute is tilted, the floor of the tilting chute normally forming a continuation of the floor of the run-way.

7. A tilting chute, means for supplying material to the chute, a cut-off extending downward from the supply end of the chute to cut off the supply means when the chute is tilted, and a bag encircling and detachably connected with the outlet of the chute.

8. A run-way provided with a traveling bottom and lateral outlets, means for directing contents of said run-way into said outlets alternately, tilting chutes opening from said outlets respectively and provided with means for closing said outlets when the chutes are tilted, respectively, and bags detachably connected with the outlets of the chutes.

9. Intercommunicating run-ways respectively provided with a traveling floor and lateral outlets and separated by partitions provided with gates, tilting chutes at the outlets respectively, and means for automatically closing the outlets when their chutes are tilted, respectively, the floor of the tilting chute normally forming a continuation of the floor of the run-way.

10. Intercommunicating run-ways respectively provided with traveling floors and lateral outlets and separated by partitions provided with gates; tilting chutes at the outlets respectively; means for automatically closing the outlets when their chutes are tilted, respectively; bags detachably connected with the outlets of the chutes, respectively; and counterbalanced suspending means connected with said bags respectively.

11. A runway provided with a lateral opening, a tilting chute communicating with such opening and having a floor normally forming a continuation of the floor of the run-way, and means to automatically stop the opening when the chute is tilted.

12. A runway provided with a lateral opening, means for diverting contents of the runway into such opening, a tilting chute communicating with the opening and having a floor normally forming a continuation of the floor of the run-way, and means to automatically stop the opening when the chute is tilted.

13. A runway having an outlet, a tilting chute communicating with such outlet and means depending from the receiving end of the tilting chute for automatically closing said outlet when the chute is tilted, the floor of the tilting chute normally forming a continuation of the floor of the run-way.

14. Intercommunicating run-ways respectively provided with traveling floors and lateral outlets and separated by partitions provided with gates; tilting chutes at the outlets respectively; a downwardly extending closure carried by the chutes at the supply end for closing the outlets when their chutes are tilted, respectively; bags detachably connected with the outlets of the chutes, respectively; and counterbalanced suspending means connected with said bags respectively.

In testimony whereof, I have hereunto set my hand at Santa Paula, California this 26th day of December 1905.

CHARLES C. TEAGUE.

In presence of—
R. L. CHURCHILL,
ARTHUR S. BRYANT.